Figure 1:
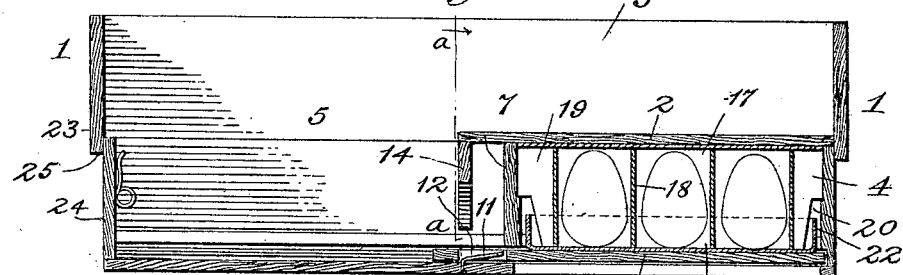

No. 821,541. PATENTED MAY 22, 1906.
J. H. RUSSELL.
RECEPTACLE FOR DELIVERING GOODS.
APPLICATION FILED APR. 29, 1905.

2 SHEETS—SHEET 1.

Witnesses
Sidney P. Hollingsworth
a. M. E. Kennedy.

Inventor
J. H. Russell
By Phil. T. Dodge
Attorney

No. 821,541. PATENTED MAY 22, 1906.
J. H. RUSSELL.
RECEPTACLE FOR DELIVERING GOODS.
APPLICATION FILED APR. 29, 1905.
2 SHEETS—SHEET 2.
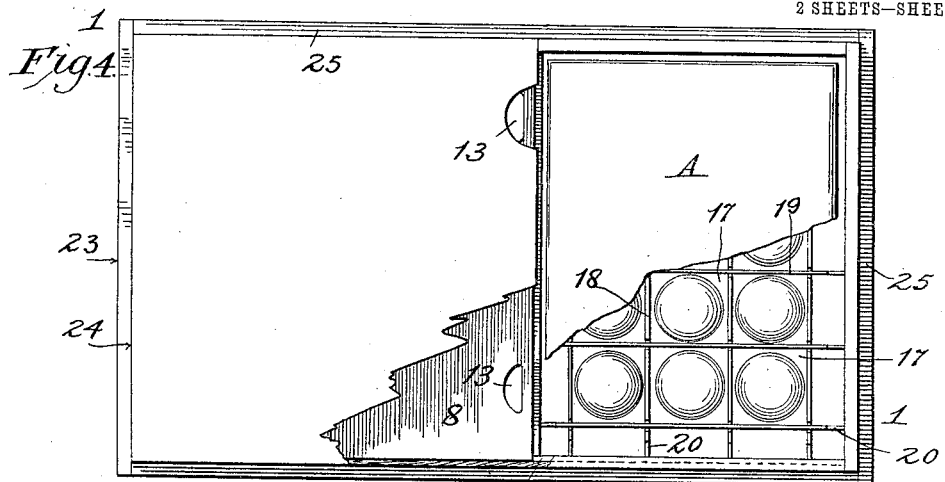
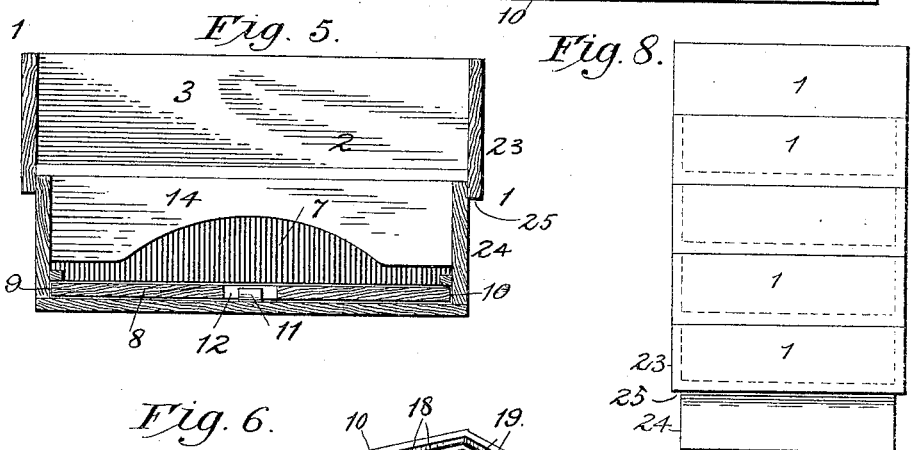
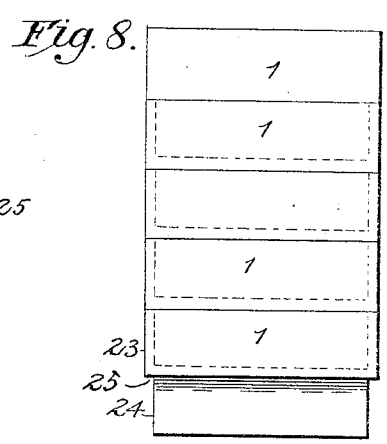
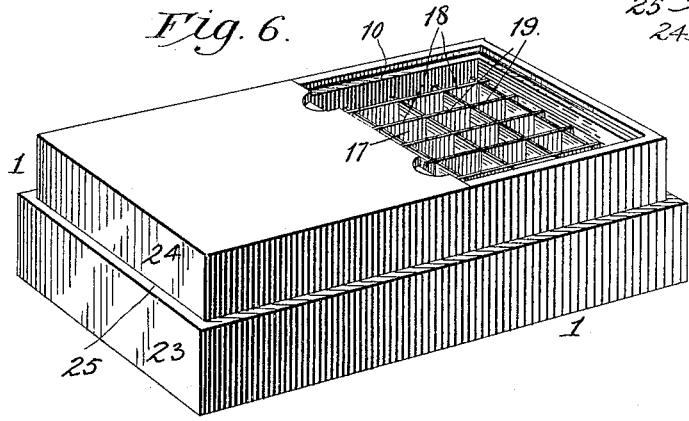
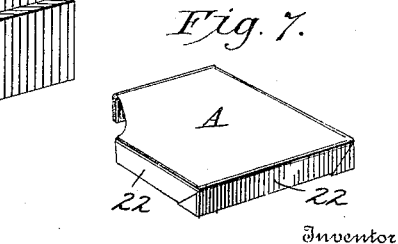
Witnesses
Sidney P. Hollingsworth
A. M. E. Kennedy
Inventor
J. H. Russell
By Phil. T. Dodge
Attorney

UNITED STATES PATENT OFFICE.

JAMES H. RUSSELL, OF MANISTEE, MICHIGAN.

RECEPTACLE FOR DELIVERING GOODS.

No. 821,541.　　　　Specification of Letters Patent.　　　　Patented May 22, 1906.

Application filed April 29, 1905. Serial No. 258,023.

*To all whom it may concern:*

Be it known that I, JAMES H. RUSSELL, of Manistee, county of Manistee, and State of Michigan, have invented a new and useful Improvement in Receptacles for Delivering Goods, of which the following is a specification.

The object of this invention is to provide a portable receptacle for transporting or delivering goods or articles more particularly of a friable nature, such as eggs, without danger of breaking them, the device being designed especially for use of porters in grocery and other stores in delivering the goods to the customer.

The invention consists, primarily, of a casing or body of improved construction having a compartment provided with a movable bottom which when in closed position will support the contents of the compartment and when opened will permit the contents to be delivered through the bottom of the compartment.

The invention consists also in combining with the delivery-compartment and its movable bottom a delivery tray or holder adapted, when the bottom is in closed position, to rest thereon, receive support therefrom throughout its extent, and give direct support to the contents of the compartment, and adapted when the bottom is moved to open position to pass from the receptacle in the act of delivering the contents and form a holder or receiver for the latter.

The invention consists in having a delivery-compartment for friable goods forming a body or casing with an additional compartment for receiving goods of a different kind, means being provided for preventing the contents of the additional compartment from coming in contact with the friable contents of the delivery-compartment, so as to avoid breakage.

The invention consists also in forming the casing or body with its upper portion enlarged and projecting beyond its lower portion, to enable a number of casings to be nested, with the lower reduced end of one casing fitting in the upper enlarged end of the next casing beneath.

The invention consists, further, in providing the casing thus formed for nesting with a carrying-handle situated in the reduced lower portion, so as not to offer an obstruction to the lower portion of the casing above when one casing is placed on another, as in nesting.

The invention consists, further, in various details of construction and combination of parts hereinafter described and claimed.

Figure 2:
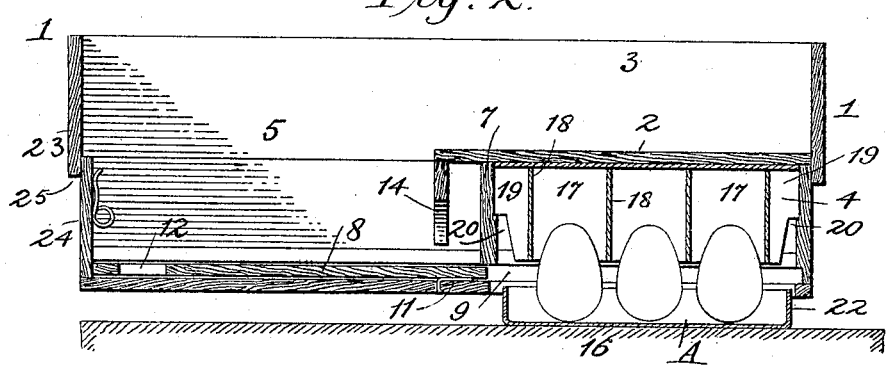
Figure 3:
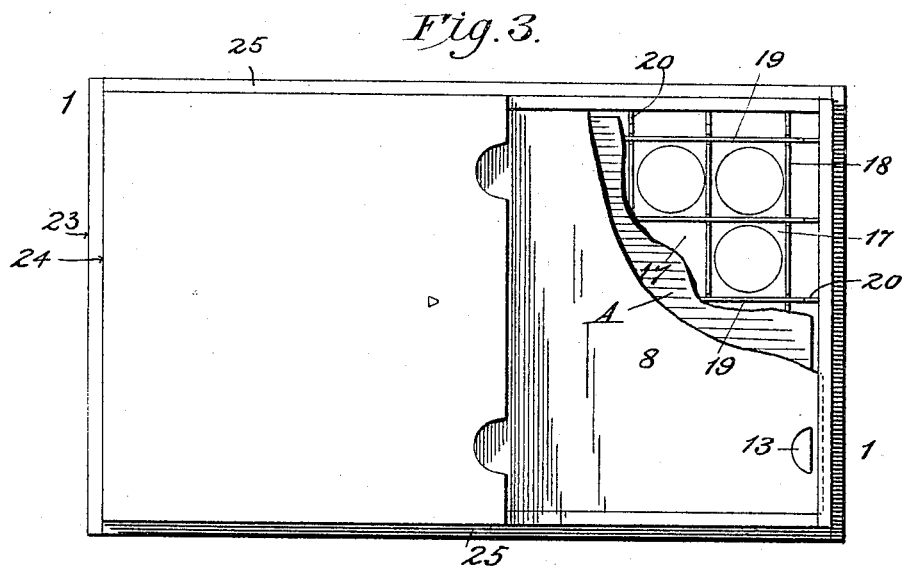

In the accompanying drawings, Figure 1 is a vertical longitudinal central section through my improved device, showing the bottom of the delivery-compartment in closed position with the contents of the chamber supported indirectly thereby. Fig. 2 is a similar view showing the movable bottom in open position and the contents partly delivered. Fig. 3 is a bottom plan view of the casing, with the movable bottom in closed position and partly broken away to expose the internal construction. Fig. 4 is a similar view with the bottom in open position and the receiving-tray partly broken away. Fig. 5 is a transverse sectional elevation on the line *a a* of Fig. 1, looking in the direction of the arrow in said figure. Fig. 6 is a perspective view of the casing turned bottom side up, with the movable bottom in open position and the delivery-compartment ready to be filled with the articles to be carried. Fig. 7 is a perspective view, partly in section, of the removable delivery tray or holder. Fig. 8 is an end elevation of a number of casings nested.

Referring to the drawings, 1 represents a body or casing which may be formed of any suitable and appropriate material, such as wood, paper, sheet-iron, wicker material, &c. The casing is preferably rectangular in form and open at its top. At one end it is provided with a horizontal partition 2, situated about midway of its height and extending toward its opposite end for about half the length of the casing, the partition thus dividing the right-hand end of the casing into upper compartment 3 and a lower compartment 4, which latter for convenience of description I designate the "delivery-compartment." To the left the casing contains a single compartment 5, extending its full depth. The delivery-compartment 4 is closed on its two opposite sides by the side walls of the casing, on its outer side by the end wall of the casing, and on its inner side by a vertical transverse partition 7, extending vertically downward from the horizontal partition a slight distance from its end. The compartment 4 is open at its lower end and is provided with a sliding bottom 8, mounted to slide in guiding-grooves 9 and 10 in the inner sides of the opposite walls of the casing at their lower ends and adapted when pushed to the right, as shown in Fig. 1, to close the bottom of the delivery-compartment and when pushed to the opposite position, as shown in Fig. 2, to open the delivery-compartment, the bottom in its opening and closing movements sliding beneath the lower end of the vertical partition 7, which terminates a sufficient distance above the bottom of the compartment 5 to allow the movable bottom to pass.

When the movable bottom is in closed position, as shown in Fig. 1, it is held locked by a vertically-yielding locking-finger 11 in the form of a flat spring-plate fixed at one end to the bottom of compartment 5 and having its other end extending upward when the sliding bottom is in closed position into a slot or hole 12 near the end of the movable bottom, the form and location of the parts being such that the end of the finger will stand just beyond the wall of said slot and act as a stop to prevent the bottom from being moved to open position. The bottom is unlocked by pressing with one finger on the locking-spring, which will force it downward free of the wall of the hole, and at the same time drawing back with another finger against the opposite wall of the hole, which action will cause the bottom to slide over the spring to open position, as shown in Fig. 2.

In the use of the device the delivery-chamber is filled with the articles to be carried by first opening the movable bottom and then turning the casing bottom side up, as shown in Figs. 4 and 6. After the contents have been placed in the compartment the bottom is drawn to closed position by engaging the finger in a hole or holes 13 formed in the sliding bottom near its end and drawing the bottom forward until the opening 12 in the opposite end of the bottom arrives over the spring locking-finger 11, whereupon the latter will spring upward into the hole and lock the bottom in closed position. The casing is then reversed in position to bring the right side up and may be carried similar to a basket by means of a handle 14, which extends transversely across the receptacle just beyond the partition 7 and which is formed by a vertical plate depending from the end of the horizontal partition 2, with its under side cut away to form a handhold, a sufficient space being left between this plate and the inner wall 7 of the delivery-compartment to admit the fingers in carrying.

When the contents of the compartment are to be delivered, the casing is placed on a table 16 or other support, and the spring locking-finger 11 being pressed down the movable bottom is drawn back to open position, which will allow the contents of the compartment to pass on to the table, the movement in their passage being very slight by reason of the proximity of the movable bottom to the surface of the table. The entire casing is now lifted by means of the handle or otherwise, and the contents of the delivery-compartment are left on the table. It will be observed that in the act of delivery the articles are not subjected to any appreciable amount of jar, such as would cause injury or breakage, the casing being lifted from around them after the withdrawal of the bottom from beneath them.

In order that the delivery-compartment may be especially adapted for the storage and delivery of very friable articles, I provide the same with a number of cells 17, each adapted to receive a single egg, which cells may be conveniently formed by fixing in the compartment a series of transverse longitudinal partitions 18 and 19, of paper board or any other suitable material, which will divide the space into a number of rectangular cells, or any other construction may be adopted by which the compartment is formed with individual cells for the articles.

In order that when articles, such as eggs, are delivered from the compartment they may be prevented from rolling off the table or support on which the delivery takes place and may be conveniently confined, I propose to employ a delivery tray or holder A, such as illustrated in Fig. 7, which is placed over the open ends of the cells after the eggs have been placed therein and while the casing is bottom side up and which when the movable bottom is closed and the casing is turned to the position for carrying will occupy the position shown in Fig. 1, giving direct support to the eggs and resting on the movable bottom, ready to pass therefrom when the bottom is opened. When now the eggs are to be delivered, the casing is, as before described, placed on the table or other support, and the movable bottom being withdrawn to open position the tray, with its contents, will be received on the table. The casing is now lifted bodily, as shown in Fig. 2, whereby the tray, with its contents, is left on the table.

The delivery-tray A is preferably of the form of a box-cover, and in order that it may be placed over the open ends of the cells and fit within the compartment beyond the path of movement of the sliding bottom the ends of the partitions forming the cells are cut away or terminate a slight distance inward of the walls of the compartment, as shown at 20 in the several figures. This arrangement will leave a continuous space around the ends of the partitions in which the rim 22 of the delivery-tray will extend when the tray is set in place for transportation.

In order that when a number of casings are being transported in the delivery-wagon or otherwise they may be compactly arranged and the contents of the open compartments protected, I so form the casings that they may be nested. This is effected by enlarging the upper portion of the casing, as at 23, so that it will extend laterally beyond the lower reduced portion 24, thus forming a shoulder or offset 25, extending continuously around the entire casing and about midway of its height. When the casings are to be nested, the lower reduced end of one will extend into the upper enlarged end of the next one beneath, the shoulder of each casing resting on the upper edge of the next casing beneath, as clearly shown in Fig. 8.

By constructing the casing with its upper half enlarged or offset it is not only adapted for nesting in the manner described, but the offset or upper part by forming a surrounding shoulder where it joins the lower part constitutes handles at opposite ends of the casing and at the sides by means of which the casing may be conveniently carried in the event of the deep compartment being so closely packed as to prevent access to the transverse carrying-handle.

The lower portion of the top open compartment 5 may be utilized to carry goods when the compartments are nested in this manner, and the goods will be effectually protected from injury by the casing above.

The carrying-handle 14, before alluded to, as will be observed, is situated within the lower reduced portion of the casing in order to permit the reduced lower end of one casing to enter the enlarged upper end of the other casing without obstruction.

From the construction described it will be observed that my improved device may be carried in a manner similar to a basket to deliver to customers orders consisting of different articles, such as eggs, potatoes, &c. In my improved device, however, articles, such as eggs, liable to breakage, may be separated and protected from injury, and in delivering them to the customers all the eggs are delivered at once without the necessity of removing them individually, as heretofore, and this without any danger whatever of breakage either in transportation or when they are delivered.

By providing the delivery-compartment with a movable bottom the removable tray, when the bottom is closed, will receive direct support from the bottom throughout the entire extent of the tray, so that there will be no liability of the weight of the contents of the delivery-compartment bending the paper tray and causing it to bind in the compartment.

The utility of my improved device resides in the ability to carry in the one body or casing different kinds of goods composing a single order, such as bundles of different articles, potatoes, eggs, &c., the eggs being placed in a separate and special compartment out of contact with the other goods and therefore free from risk of breakage, which special compartment is provided with a delivery-bottom adapted when withdrawn to open the compartment and permit the eggs to pass directly and without danger of breakage onto the table or other receiving-surface.

Having thus described my invention, what I claim is—

1. A portable device for the storage and delivery of goods, comprising a casing or body having at one end a compartment open at its top and closed permanently at its bottom, and having at its opposite end a second compartment closed at its top, a vertical partition separating said compartments, and a movable bottom for the second compartment.

2. A portable device for the storage and delivery of goods, comprising a casing or body having a delivery-compartment, a movable bottom for said compartment, and a removable tray or holder adapted to be confined in said compartment when the bottom is closed and receive direct support throughout its extent from the bottom, said tray adapted to be delivered therefrom with the contents of the compartment when the bottom is opened.

3. A device for the storage and delivery of goods comprising a casing or body, having at one end a compartment open at its top, closed permanently at its bottom and extending the full height of the casing; and having at its other end, and at the base of the casing, a non-communicating compartment closed at its top and extending for a portion only of the height of the casing, and a sliding bottom for the said non-communicating compartment.

4. In a portable device for the storage and delivery of goods, the combination with a casing having at one end a delivery-compartment closed at its top and provided with a movable bottom, and having at its opposite end a compartment closed at its bottom and open at its top, of a carrying-handle extending transversely with the casing at the side of the delivery-compartment and situated below the top of said delivery-compartment.

5. A portable device for storing and delivering goods, comprising a rectangular casing having its bottom portion open at one end and closed at the other end; a horizontal partition extending inward from the end of the casing above the open bottom portion, and terminating midway or thereabout of the length of the casing; a transverse partition extending downward from the horizontal partition; whereby a compartment is formed at one end of the casing with an open bottom and a closed top; and a horizontal sliding bottom for said compartment.

6. A device for the storage and delivery of goods, comprising a casing or body having at one end a compartment open at its top, a fixed bottom for said compartment, a second non-communicating compartment in the other end of the casing closed at its top, and a sliding bottom for the second compartment adapted when moved to open position to slide over the bottom of the first compartment.

7. In a device for the storage and delivery of goods, the combination with a casing provided with a delivery-compartment, of a sliding bottom for said compartment formed near one edge with an opening or slot, and a spring locking-finger sustained by the casing beneath the said sliding bottom and adapted when the latter is in closed position to extend upward yieldingly in said slot opposite the front wall thereof; whereby the spring locking-finger may by one finger be depressed below the bottom, while with the other finger the latter may be withdrawn to open the delivery-compartment.

In testimony whereof I hereunto set my hand, this 22d day of April, 1905, in the presence of two attesting witnesses.

JAMES H. RUSSELL.

Witnesses:
    JAS. L. SIBBEN,
    MAUDE M. RUSSELL.